Figure 1:
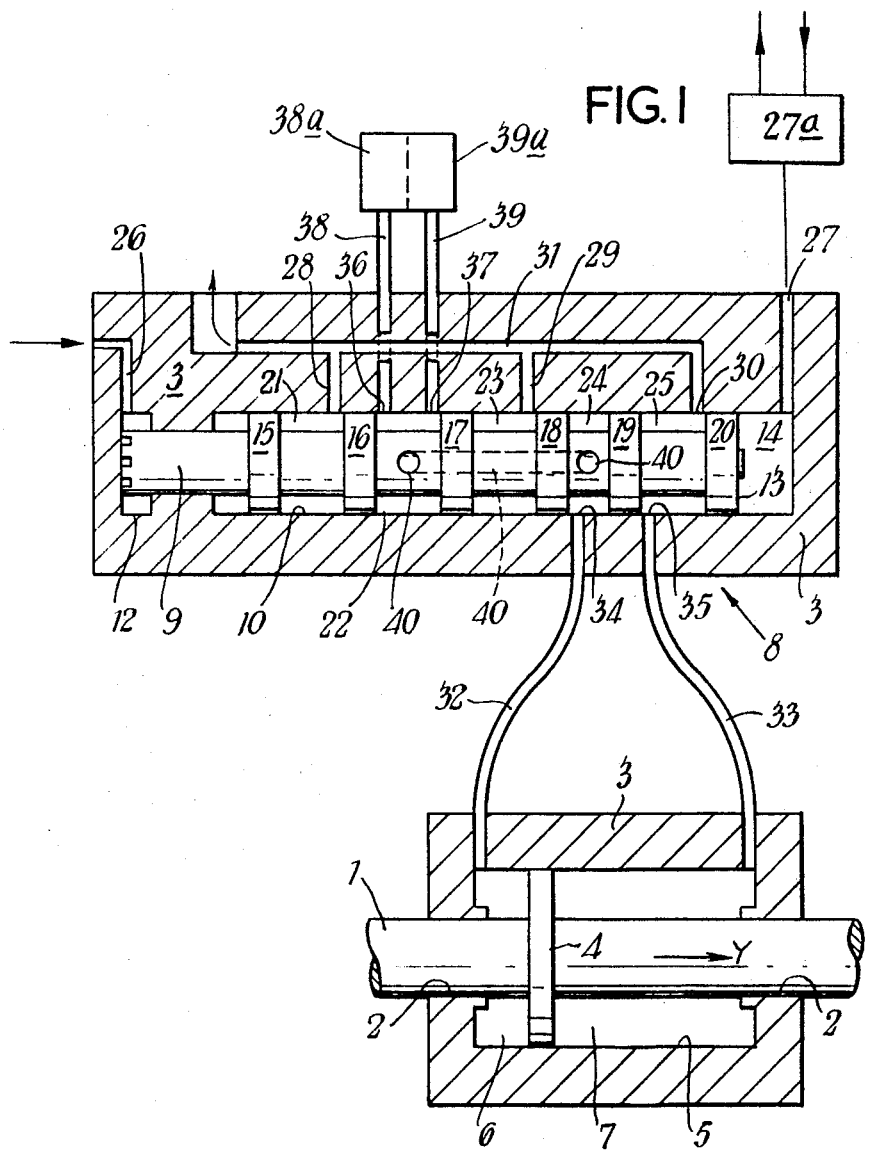

# United States Patent

[11] 3,596,560

| [72] | Inventor | Philip Butterworth<br>Bramhall, England |
|---|---|---|
| [21] | Appl. No. | 795,536 |
| [22] | Filed | Jan. 31, 1969 |
| [45] | Patented | Aug. 3, 1971 |
| [73] | Assignee | Butterworth Hydraulic Developments<br>Limited |
| [32] | Priority | Feb. 12, 1968 |
| [33] | | Great Britain |
| [31] | | 6796/68 |

[54] FLUID PRESSURE OPERATED MOTORS
6 Claims, 2 Drawing Figs.

[52] U.S. Cl. ..................................................... 91/6,
137/625.68, 137/625.67
[51] Int. Cl. ...................................................... F01b 25/02
[50] Field of Search ............................................ 91/6, 463,
443; 137/625.68, 625.67

[56] References Cited
UNITED STATES PATENTS
2,000,822  5/1935  Clarke ............................. 137/625.68

2,046,447  7/1936  Clarke ............................. 91/463

FOREIGN PATENTS
941,041  3/1956  Germany ........................ 91/6

*Primary Examiner*—Martin P. Schwadron
*Assistant Examiner*—C. F. Schimikowski
*Attorney*—Stevens, Davis, Miller and Mosher ABSTRACT: A fluid pressure operated motor having valve means adapted to control the flow of fluid under pressure to the pressure chambers from two separate sources of fluid under pressure, the valve means so controlling the flow of fluid that, in a first controlled position of the valve means, fluid from both sources is admitted into a first pressure chamber simultaneously with the second pressure chamber exhausting to cause the piston to move axially in one direction and, in a second controlled position of the valve means, fluid from only one of the sources is admitted into the second pressure chamber simultaneously with the first pressure chamber exhausting to cause the piston to move axially in the opposite direction.

FLUID PRESSURE OPERATED MOTORS

The invention relates to fluid pressure operated motors and in particular to such motors of the type which incorporate a double acting piston and cylinder device.

A fluid pressure operated motor of the type to which the present invention relates (hereinafter referred to as "the type specified") includes a piston adapted to reciprocate in an axial direction in a piston cylinder, the piston having a pair of opposed working faces which communicate one each with a pair of pressure chambers, the piston being movable axially by the admittance of fluid under pressure to one of said pressure chambers simultaneously with the exhausting of the other pressure chamber, there being provided valve means which is adapted to connect the pressure chambers to exhaust and to a source of fluid under pressure alternately to cause the piston to reciprocate intermittently or continuously.

It is frequently desirable that the feed of the piston in its cylinder is different for both senses of axial direction, for example, in its application to machine tools, the piston can carry a cutting tool and it may be necessary to provide a slow working or cutting stroke of the tool to the work piece whilst maintaining a fast withdrawal of the tool, such application is particularly relevant to gear shaper and like machines. It has hitherto been proposed to provide different rates of feed of the piston in its cylinder in both axial directions by providing different relative areas of the opposed working faces of the piston and maintaining a constant flow rate input to the motor; this however means that the speed of the piston in one direction is directly proportional to the speed of the piston in the reverse direction and consequently if, say, the cutting stroke speed of the piston is decreased the withdrawal stroke speed of the piston is decreased in proportion thereto thus having the disadvantage that the time of the overall cutting cycle is increased. It is the object of the present invention to provide a fluid pressure operated motor of the type specified which can provide different rates of feed of the piston in its cylinder for both axial directions and in which the speed of stroke of the piston in one direction can be maintained constant irrespective of the speed of stroke of the piston in the reverse direction.

According to the present invention there is provided a fluid pressure operated motor of the type specified in which the valve means is adapted to control the flow of fluid under pressure to the pressure chambers from two separate sources of fluid under pressure, said valve means so controlling the flow of fluid that, in a first control position of said valve means, fluid from both sources is admitted into a first pressure chamber simultaneously with the second pressure chamber exhausting to cause the piston to move axially in one direction and, in a second control position of said valve means, fluid from only one of said sources is admitted into the second pressure chamber simultaneously with the first pressure chamber exhausting to cause the piston to move axially in the opposite direction.

Conveniently, when only one source of fluid under pressure communicates with a pressure chamber the other source is connected to exhaust.

The invention further includes a fluid pressure operated motor as above described when in combination with pressure means adapted to provide the two separate sources of fluid under pressure.

The fluid pressure sources can be provided by two discrete pumps or from a single pump in which the output is divided into two separate flows (for example by auxiliary flow divider means) and in which the pressure of one flow remains unaltered by a variation in load applied to the other flow or if the other flow is opened to atmosphere and vice versa. If required means can be provided whereby the flow and pressure of fluid from each source is capable of adjustment to provide varying rates of feed for the piston in either sense of direction of its axial movement.

The valve means is preferably in the form of a spool valve in which two axially spaced inlet ports in the spool cylinder are adapted to be connected, one each to the two sources of fluid under pressure and in which two axially spaced control ports in the spool cylinder communicate, one each to the pressure chambers. The spool is adapted to reciprocate in its housing and has lands which control the ports in the spool cylinder. The spool lands are so arranged that at one end of stroke, the spool connects both inlet ports to a first pressure chamber by way of one control port and connects the second pressure chamber to exhaust by way of the other control port and at the other end of its stroke the spool connects one inlet port to the second pressure chamber by way of the other control port and connects the first pressure chamber to exhaust by way of the one control port. Consequently if the spool is reciprocated in its cylinder the piston is caused to reciprocate continuously or intermittently.

Reciprocation of the spool in the spool valve can conveniently be controlled by the opening and closing of ports in the piston cylinder by control surfaces on the piston during reciprocation of the piston so that the spool reverses at each end of the stroke of the piston. Preferably control ports in the piston cylinder, control surfaces on the piston and the spool to provide reciprocation of the spool in phase with the reciprocation of the piston are arranged in accordance with the disclosures in our copending British Pat. Applications Nos. 9858/65, 55226/66, 41082/67, or 28148/67.

A motor constructed in accordance with the present invention can conveniently be combined with the motors which are disclosed in our copending British Pat. Applications Nos. 6798/68, 6797/68 and 6795/68 so that, in addition to the provision of different feeds for the piston in its cylinder, the combined motor incorporates means whereby the mid position of the stroke of the piston about which position the piston oscillates can be varied axially relative to the cylinder within which the piston oscillates, the piston can be arrested at each end of its stroke by the development of a fluid blockage in the pressure chambers, the axial length of stroke for the piston can be adjusted as required and a tool carried by the piston can be caused to exhibit a compound motion due to the combined effects of reciprocation of the piston and reciprocation of a spool which follows a cam surface provided on the piston.

It is to be realized that the term "fluid" as used throughout this specification is intended to include both liquid (as for hydraulically operated motors) and gas (as for pneumatically operated motors) and any detailed modifications required in the motor for use with either form of fluid will be apparent to persons skilled in the relevant art.

Figure 2:
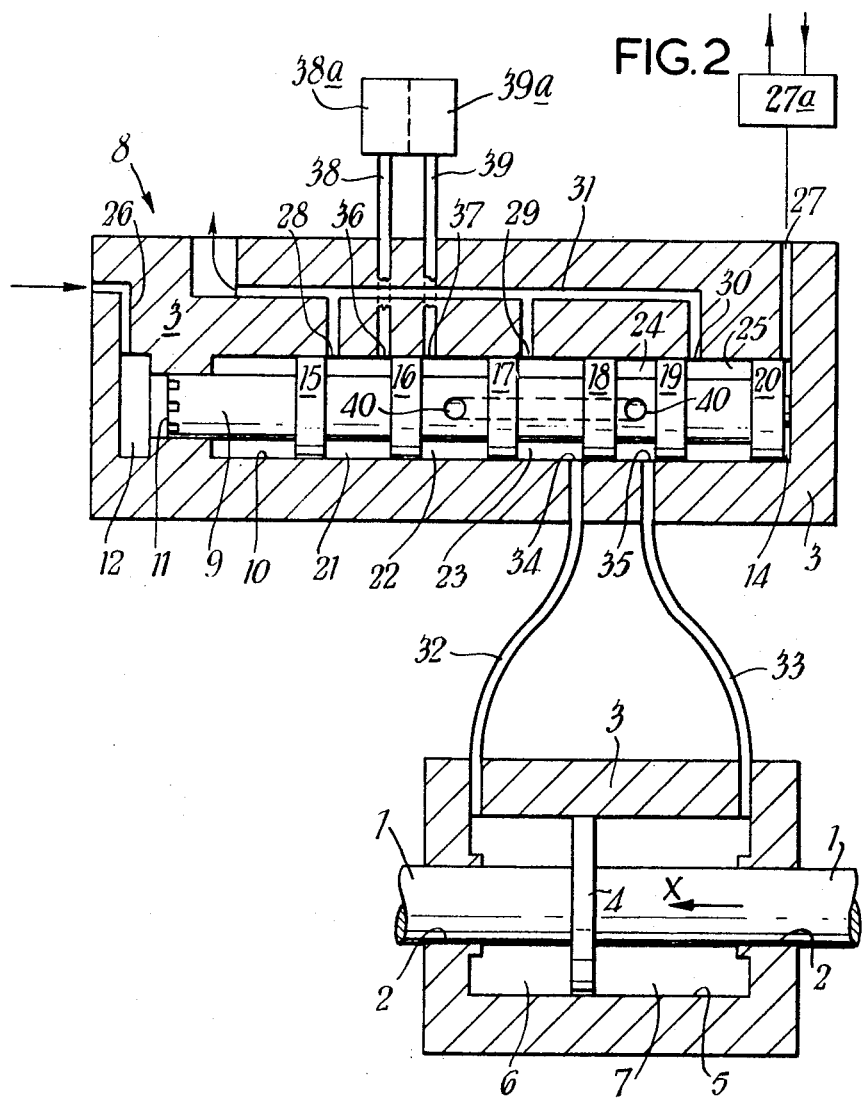

One embodiment of the present invention will now be described, by way of example only, with reference to the accompanying diagrammatic drawing in which:

FIG. 1 is an axial cross section through a motor constructed in accordance with the present invention in which the valve means is provided by a spool valve, the spool being illustrated at one end of its stroke to cause the piston to move axially in one sense of direction, and FIG. 2 is a similar view to that shown in FIG. 1 and illustrates the spool at the other end of its stroke to cause the piston to move axially in the opposite sense of direction.

The motor illustrated includes a piston 4 which is adapted to reciprocate in an axial direction in a piston cylinder 5 defined by a housing 3. The piston 4 has axially extending piston rods 1 which are slidable in sealed manner through bores 2 provided in opposed end walls of the piston cylinder 5. One side face of the piston 4 and the adjacent end part of the piston cylinder 5 together define a pressure chamber 6 and the other side face of the piston 4 and the adjacent end part of the piston cylinder 5 together define a further pressure chamber 7. It will be apparent that if the pressure chamber 6 is pressurized whilst the chamber 7 is exhausted the piston 4 (and rods 1) will move in an axial direction rightwardly in the drawing and if the chamber 7 is pressurized whilst the chamber 6 is exhausted the piston (and rods) will move in an axial direction leftwardly in the drawing so that the mechanism acts as a double acting piston and cylinder device.

The motor further includes a pressure biased spool valve shown generally at 8 in which a stepped spool 9 is slidably located for movement in an axial direction in a spool cylinder 10 having a stepped bore. The spool cylinder 10 is conveniently defined by the housing 3'. The spool 9 is located in its cylinder so that the smaller diameter of the spool is located in the smaller bore of the spool cylinder and the larger diameter of the spool is located in the larger bore of the spool cylinder. The smaller end face 11 of the spool defines with one end part of the spool cylinder 10 a constant pressure spool chamber 12 and the larger end face 13 of the spool defines the other end part of the spool cylinder 10 an alternating pressure spool chamber 14. The spool is provided with six lands 15 to 20 which define with the spool cylinder 10 an array of axially spaced annular transfer chambers 21 to 25. The constant pressure spool chamber 12 is adapted to be connected to a source of hydraulic fluid under constant pressure by way of a passage 26 and the alternating pressure spool chamber 14 is adapted to be connected, through a passage 27, and means shown generally at 27a alternately with hydraulic fluid under constant pressure and exhaust. It will be apparent that when the alternating pressure spool chamber 14 is open to exhaust and fluid pressure is in the constant pressure spool chamber 12, the spool 9 will move axially in the direction of its bias (rightwardly in the drawing) from the position shown in FIG. 1 to the position shown in FIG. 2, and when the alternating pressure spool chamber 14 is connected to fluid under pressure the spool 9 will move axially in the direction against its bias (leftwardly in the drawing) that is from the position shown in FIG. 2 to the position shown in FIG. 1.

Located in the spool cylinder 10 are three axially spaced exhaust ports 28 to 30 which are in permanent communication respectively with the annular transfer chambers 21, 23 and 25 irrespective of the position of the spool in its cylinder. Each of the ports 28 to 30 communicates with a passage 31 which is open to exhaust.

The pressure chambers 6 and 7 communicate with the spool cylinder 10 through passages 32 and 33 which passages open into the spool cylinder at a pair of axially spaced control ports 34 and 35 respectively. The control port 34 is controlled by spool land 18 so that with the piston at the end of its stroke in the direction against its bias the port 34 communicates with the transfer chamber 24 and as the spool 9 moves in the direction of its bias the control port 34 is closed by the spool land 18 and reopened to communicate with the transfer chamber 23 and thereby exhaust (see FIG. 2). Similarly the control port 35 is controlled by the spool land 19 and is located so that with the spool at the end of its stroke in a direction against its bias the control port 35 communicates with the transfer chamber 25 and thereby exhaust (see FIG. 1) and when the spool moves axially in the direction of its bias the control port 35 is closed by the spool land 19 and is reopened to communicate with the transfer chamber 24 (see FIG. 2).

The spool lands 18 and 19 are so arranged with respect to the control ports 34 and 35 that, for any position of the spool, ports 34 and 35 are never simultaneously open to exhaust and are never simultaneously open to the transfer chamber 24.

Located in the spool cylinder 10 are a pair of axially spaced pressure inlet ports 36 and 37 which are adapted to communicate through passages 38 and 39 respectively with two independent sources of fluid under pressure shown generally at 38a and 39a. The sources 38a and 39a are conveniently provided by two independent pumps or alternatively by the outlets from a multiflow pump provided that the pressure of fluid in one of the passages 38 or 39 remains unaffected by any variation in load to which the other passage is subjected or even if the other passage is opened to exhaust. The inlet port 37 is located in the spool cylinder 10 so that it permanently communicates with the transfer chamber 22 irrespective of the position of the spool in its cylinder. The inlet port 36 opens into the spool cylinder 10 and is controlled by the spool land 16. The inlet port 36 is so located that with the spool 9 situated at the end of its stroke in the direction against its bias, (see FIG. 1) the port 36 communicates with the transfer chamber 22 and as the spool moves axially in the direction of its bias the port 36 is closed by the spool land 16 and reopened thereby to communicate with the transfer chamber 21 and thereby exhaust (see FIG. 2). The transfer chamber 22 is in permanent communication with the transfer chamber 24 by way of an internal passage 40 in the spool.

We will now consider operation of the motor as above described and illustrated. The passages 26 and 27 are connected to a source of hydraulic fluid under pressure to cause the spool to move in the direction against its bias and to be held at the end of its stroke in the position shown in FIG. 1. Hydraulic pumps 38a and 39a are operated and fluid under pressure passes through both passages 38 and 39 into the transfer chamber 22, by way of passage 40 into transfer chamber 24, through control port 34 and passage 32 into the pressure chamber 6. The pressure chamber 7 communicates by way of passage 33, control port 35, transfer chamber 25, exhaust port 30 and passage 31 with exhaust and consequently the piston 1 moves axially in the direction of arrow Y at a feed proportional to the output from both pumps 38a and 39a.

If the passage 27 is now opened to exhaust, the alternating pressure spool chamber 14 is exhausted and the spool moves in the direction of its bias to the end of its stroke as shown in FIG. 2. The inlet port 36 now communicates with the transfer chamber 21 and hence through exhaust port 28 and passage 31 to exhaust so that the whole output from the pump 38a flows to exhaust. However the output from the pump 39a passes through passage 39 and inlet port 37 into the transfer chamber 22 and hence through the passage 40 to transfer chamber 24 and by way of control port 35 and passage 33 into the pressure chamber 7. The pressure chamber 6 communicates through passage 32, control port 34, transfer chamber 23, exhaust port 29 and passage 31 to exhaust and consequently the piston 1 moves axially in the direction of arrow X at a speed which is proportional to the sole output of the pump 39a. It will therefore be appreciated that the speed of the piston during movement in the direction X is less than the speed in the direction Y and that these speeds can be varied as required by suitable adjustment of the outputs from the pumps 38a and 39a.

If it is required that the piston 1 should automatically reciprocate continuously or intermittently, means can be provided for automatically reversing the spool when the piston reaches one or other end of its stroke, for example by incorporation of auxiliary ports (not shown) in the piston cylinder which are controlled by the position of the piston to control the flow of fluid under pressure to or exhaust from the alternating pressure spool chamber 14 so that reversal of the spool is maintained in phase with reversal of the piston (that is to say the piston and auxiliary ports act as an auxiliary valve to control reversal of the spool 9).

What we claim is:

1. A fluid pressure operated motor which includes a piston adapted to reciprocate axially in a piston cylinder, said piston having a pair of opposed working faces which communicate one each with a pair of pressure chambers; two sources of fluid under pressure; valve means adapted to connect said pressure chambers alternately to exhaust and to fluid under pressure to cause the piston to reciprocate, said valve mans comprising a spool adapted to reciprocate in a spool cylinder and means for reciprocating said spool in its cylinder; land means on said spool defining with said spool cylinder at least two axially spaced transfer chambers; passage means which communicate between said transfer chambers at one axial position of the spool in its cylinder and at a further axial position of the spool in its cylinder; two axially spaced inlet ports in said spool cylinder communicating one each with said two fluid pressure sources, one of said inlet ports being in permanent communication with a first of said transfer chambers and the other of said inlet ports being controlled by said spool land means during reciprocation of the spool whereby said other inlet port is alternately opened and closed to communication with said first transfer chamber; two axially spaced control ports in the spool cylinder communicating one each with said two pressure chambers, said control ports being controlled by said spool land means during reciprocation of the spool so that said second transfer chamber is opened to communication alternately with each control port and when one of said control ports communicates with said second transfer chamber the other control port communicates with exhaust and vice versa, whereby at said one axial position the spool in its cylinder, both said inlet ports communicate by way of said passage means and transfer chambers with a first of said pressure chambers and the second of said pressure chambers is open to exhaust, and at said further axial position of the spool in its cylinder, one only of said inlet ports communicates by way of said passage means and transfer chambers with the second of said pressure chambers and the first of said pressure chambers is open to exhaust.

2. A fluid pressure operated motor as claimed in claim 1 wherein with said valve means in said second control position, one of said two sources communicates with the second of said pressure chambers and the other of said two sources communicates with exhaust.

3. A fluid pressure operated motor as claimed in claim 1 wherein said transfer chambers are in permanent communication by way of an internal passage defined in the spool.

4. A fluid pressure operated motor as claimed in claim 1 wherein said spool has opposed working faces of different effective areas, the working face of smaller effective area defining with one part of the spool cylinder a constant pressure spool chamber adapted to be connected to a source of fluid under constant pressure and the working face of larger effective area defining with another part of the spool cylinder an alternating pressure spool chamber adapted to be connected alternately to a source of fluid under pressure and exhaust, whereby with said constant pressure spool chamber connected to fluid pressure the spool is caused to reciprocate by connecting the alternating pressure spool chamber alternately to fluid pressure and exhaust.

5. A fluid pressure operated motor as claimed in claim 1 wherein said two separate sources of fluid under pressure comprise two discrete fluid pumps.

6. A fluid pressure operated motor comprising a piston adapted to reciprocate in an axial direction in a piston cylinder, said piston having a pair of opposed working faces which communicate one each with a pair of pressure chambers, said piston being movable axially by the admittance of fluid under pressure to one of said pressure chambers substantially simultaneously with the exhausting of the other of said pressure chambers; at least two separate sources of fluid under pressure; and valve means connecting said pressure chambers to exhaust and to fluid under pressure alternately to reciprocate said piston; wherein said valve means comprises a spool adapted to be reciprocated in a spool cylinder and means for reciprocating said spool in its cylinder, said spool having opposed working faces of different effective areas, the working face of smaller effective area defining with one part of the spool cylinder a constant pressure spool chamber adapted to be connected to a source of fluid under constant pressure and the working face of larger effective area defining with another part of the spool cylinder an alternating pressure spool chamber adapted to be connected alternately to fluid under pressure and exhaust, whereby with said constant pressure spool chamber connected to fluid under pressure the spool is caused to reciprocate by connecting the alternating pressure spool chamber alternately to fluid under pressure and exhaust; said spool cylinder having two axially spaced inlet ports connected one to each of said two sources and two axially spaced control ports which communicate, one each, with said pressure chambers; said ports in said spool cylinder being controlled by lands on said spool during reciprocation of said spool whereby, at one end of stroke of said spool both said inlet ports communicate with a first of said pressure chambers and a second of said pressure chambers is open to exhaust, and at the other end of stroke of said spool, one only of said inlet ports communicates with the second of said pressure chambers and the first of said pressure chambers is open to exhaust.